United States Patent [19]
Horak

[11] Patent Number: 5,871,324
[45] Date of Patent: Feb. 16, 1999

[54] SHIPLOADER SYSTEM

[76] Inventor: Ralph M. Horak, 9029 E. Mississippi Ave., Apt. P-302, Denver, Colo. 80231-6809

[21] Appl. No.: 854,632

[22] Filed: May 12, 1997

[51] Int. Cl.$^6$ .................................................. B65G 67/60
[52] U.S. Cl. .................................... 414/140.9; 414/141.4; 414/803; 198/594
[58] Field of Search ............................. 414/139.4, 140.8, 414/140.9, 141.3, 141.4, 141.6, 141.8, 142.1, 142.2, 803; 198/588, 594

[56] References Cited

U.S. PATENT DOCUMENTS

| | | | |
|---|---|---|---|
| Re. 26,298 | 11/1967 | Oury et al. ............................ | 198/588 |
| 3,361,248 | 1/1968 | Daymon . | |
| 3,499,522 | 3/1970 | Novak . | |
| 3,754,669 | 8/1973 | Alsen . | |
| 3,856,159 | 12/1974 | Soros . | |
| 4,073,390 | 2/1978 | Van Cappelle ..................... | 414/140.9 |
| 4,082,181 | 4/1978 | Berthold . | |
| 4,925,010 | 5/1990 | Pallasvirta . | |
| 5,024,568 | 6/1991 | Johnston ............................. | 414/140.9 |
| 5,193,964 | 3/1993 | Soros .................................. | 414/140.9 |
| 5,271,701 | 12/1993 | Hopland . | |

FOREIGN PATENT DOCUMENTS

| | | | |
|---|---|---|---|
| 1037489 | 7/1936 | France . | |
| 633616 | 9/1953 | Germany . | |
| 2079234 | 1/1982 | United Kingdom ............... | 414/140.9 |

OTHER PUBLICATIONS

Soros, "Linear Loader Economics," Skillings Mining Review, Oct. 29, 1977, vol. 66, No. 44, pp. 2–7.
Dibben, "Shiploaders for Bulk Materials," Bulk Solids Handling, vol. 12, No. 3, Sep. 1992.
Goller, "The Weipa Kaolin Shiploader," Bulk Solids Handling, vol. 5, No. 6, Dec. 1985.
"Shiploader for Coal", PHB Weswerhutte AG, product information bulletin.
"Shiploader for Coal, Capacity 10500 t/h", PHB Weswerhutte AG, product information bulletin.

*Primary Examiner*—Karen M. Young
*Assistant Examiner*—Douglas Hess
*Attorney, Agent, or Firm*—Ramon L. Pizarro

[57] ABSTRACT

A system and method for transporting material from an approach conveyor on to an elongate transport device such as a ship. The ship being positioned at a predetermined orientation, preferably on against a set of docking piers, relative to the approach conveyor. The system and method uses at least one slewing conveyor with a first end and a second end, the slewing conveyor being capable of pivoting about a pivot point and accepting material at the first end and conveying the material to the second end, the second end of the slewing conveyor being capable of discharging the material on to the ship while the ship is at the predetermined orientation. A bridge conveyor having a first end and a second end, the first end of the bridge conveyor being pivotally supported for pivotal motion about a point near the approach conveyor, and the second end of the bridge conveyor being moveably supported near the first end of the slewing conveyor, so that the second end of the bridge conveyor may move together with the first end of the slewing conveyor, so that material from the approach conveyor that has been delivered to the first end of the bridge conveyor may be delivered by the bridge conveyor to the second end of the slewing conveyor, so that the slewing conveyor may deliver the material to the ship.

10 Claims, 11 Drawing Sheets

SHIPLOADER SYSTEM

BACKGROUND OF THE INVENTION (a) Field of the Invention

This invention generally relates to a system for transporting bulk materials to a ship, and more particularly, but not by way of limitation, to a shiploader system which incorporates a slewing boom to deliver bulk materials into the cargo hold areas of a ship.

(b) Discussion of Known Art

The transport of fungible materials such as ores or grains from one part of the world to another has been advantageously carried out by means of ships. Perhaps the greatest advantage of transporting these materials by ship has been the low cost associated with ocean transport. However one serious drawback to the use of ocean transport has been the cost and time delays associated with providing the infrastructure needed to load the vessels.

To evaluate the cost of a system one should focus on both the initial capital cost as well as the operating cost. The capital cost is generally determined by the capacity of the shiploading system, the size of vessel to be loaded and the type of shiploading system to be used. The type of shiploading system to be used determines the type of structure that must be installed to accommodate the ship and the loading system. Key components of the structure that must be installed includes the breasting structure, which includes breasting and mooring dolphins to accept the ship during loading. The system will also require support structure to accommodate the key components that make up the shiploading mechanism. Finally the system will also require conveyor structure for the approach conveyor system that feeds the shiploading mechanism.

Another concern associated with the selection of the type of shiploading system to be installed includes the lead time required for securing the shiploader system itself. This problem is particularly acute for large systems, since only a few manufacturers in the world have the facilities and technical ability to build these systems. The facilities and technology required to build these large systems results in lead times of as much as a year or more from the time of ordering the system to the time that the system is delivered for installation at the erection site.

Also of concern with shiploading systems are the costs of maintenance and the reliability of the systems. Thus, it is important to select a system that includes components that have been proven to be reliable mechanisms or components that may be purchased from a variety of manufacturers or suppliers. Therefore, the use large, complicated, custom components will undoubtedly result in increased risk of loss due to long downtime produced by long lead times needed for acquiring spare parts for specialty or custom fabricated systems.

Still another concern in the selection of a shiploading system is the system's ability to distribute the cargo to the different cargo holds of the vessel. Cargo distribution generally involves three important factors, these include distribution of cargo within each cargo hold, speed or rate of delivery to a cargo hold, and speed or ability to advance from one cargo hold to another cargo hold on the same vessel. The system's ability to distribute cargo within a cargo hold allows more efficient use of the space within the hold. Consequently, the vessel's carrying capacity can be improved by using a loading system that produces good cargo distribution. Perhaps the most immediately observable improvements from improved distribution is the increase in the efficiency of use of the cargo carrying space within the cargo bins or holds. (As used herein, the term cargo bin is synonymous with cargo hold.) Thus a system which can reach the furthest corners of the cargo bins will allow a more complete and uniform filling of the bin as compared with a system that can only reach a specific point or partial area of the cargo bin. It is important to fill the cargo bins by creating a generally flat, uniform pile of material. By stacking the cargo in a generally flat, uniform pattern, versus a generally cone shape produced by pouring the material from a single point, one maximizes the stability of the vessel. The added stability, which translates into added safety, is produced by the fact that a flat, uniform distribution of the cargo within the vessel will result in a center of gravity for the cargo that coincided with the center of gravity of the vessel. By producing a cargo load, or loaded shipment, where the center of gravity of the loaded shipment coincides with the center of gravity of the ship, one reduces the existence of an overturning moment produced by a distance between the center of gravity of loaded shipment and the center of gravity of the ship. Moreover, a flat, uniform distribution of the cargo will avoid shifting of the cargo during the voyage. By preventing shifting of the load one reduces the possibility of de-stabilizing the vessel during the voyage.

Another important aspect to consider in evaluating a shiploading system is the system's average loading rate instead of its nominal or design loading rate. The average loading rate for the system is the tons of cargo delivered to the ship divided by the amount of time that it took to fill the ship. Thus the average loading rate results in a statistic that reflects the overall efficiency of the system since it is a function of the size and speed of the conveyors used within the system, as well as a function of the steps that must be carried out in loading the vessel. Thus a system with conveyors of high capacity or high nominal rate may achieve a low average loading rate if these conveyors must be stopped frequently and for longer periods of time to allow the shifting of the loading system relative the vessel's position in order to provide access to the different bins of the vessel.

Since the time to load a vessel is unproductive use of the vessel, and may even present a constraint in the overall productivity of the system producing the fungible goods, is advantageous to minimize the time to load the vessel by increasing the average loading rate of the shiploading system for every vessel. The rate at which the vessel is loaded depends on both the material delivery rate (the nominal rate) and the system's ability to shift loading procedures from one cargo bin or hold to another. It is essential that the system loads the different cargo bins in a sequence that minimizes the possibility of damage to the vessel's structure and stability. For example, one typically begins loading at the ship's forward most cargo hold, since this hold is likely to be the highest point of the hull above the water due to the fact that this is the lightest section of the vessel.

The loading of the cargo holds will proceed by partially loading a cargo hold, and then proceeding to partially loading the next desired hold. This piecemeal, back and forth, loading is carried out in order to minimize the possibility of introducing a dangerous imbalance caused by a difference in the location of the center of gravity of the cargo and the center of gravity of the ship, as well as to prevent the possibility of damaging the vessel's structure, for example by placing large loads at the extremes of the vessel. Thus it is clear that an important characteristic of a shiploading system is its ability to load the vessel in a piecemeal fashion, while maintaining good overall loading rates.

Examples of known shiploader installation configurations include five basic types of shiploading systems. These systems include fixed loaders, traveling loaders, quadrant loaders, slewing/traversing loaders, and linear loaders.

Fixed loaders allow simple luffing or combined slewing and luffing type movement to distribute the loads to the different cargo holds of the vessel. The fixed loader is still used due to its simplicity and low acquisition and maintenance cost, but due to its limited movement and reach the fixed loader suffers from significant disadvantages. Perhaps the greatest disadvantage of the fixed loader is that it requires that the ship be shifted relative to the loader in order to allow filling of each of the different cargo holds. This exposes the ship and docking structure to the danger of accidental collisions. Moreover, the shifting of the ship's position is more time consuming than shifting a shiploader's position relative to the vessel, and thus the use of the fixed loader wastes valuable equipment time, resulting in a low average loading rate.

The traveling loader system is perhaps the oldest known alternative to a fixed loader and consists of a large, straight runway and a dock conveyor system that is mounted in a generally parallel fashion to the runway. To transfer cargo to a ship's cargo bin with this kind of system the cargo is first transported to the runway area by an approach conveyor. Then the approach conveyor transfers the load to the dock conveyor on the runway, and then from the dock conveyor the load is transferred to a boom that delivers the cargo to the ship's holding bin.

With the traveling shiploader system the ship is moored against dolphins that allow the ship to be held in a parallel orientation to the system's runway. Thus, to load the various holding bins of the ship, the boom system must be able to travel along the runway, with the boom in a generally perpendicular orientation to the runway. While the traveling shiploader systems have proven to be reliable and effective, they have limitations. Perhaps the greatest limitation of these systems is that they require extensive marine structure for the dock and runway of the shiploader system. This translates into large, costly installations with long construction lead times.

Another major limitation is that the feeding point of the conveyor system on a traveling loader is fixed along a line defined by the length of the shiploader's boom. Also, the shifting the boom from one cargo bin to the next can only be carried out in one direction without emptying the dock conveyor. For example, if the shiploader begins to deliver cargo to the bin closest to the stern of the ship (in situation where the ship is docked such that its stern is closest to the approach conveyor) it may shift to cargo bins that are successively closer to the bow of the ship. Due to the fact that the boom on the traveling loader may not reverse its direction of shifting without first stopping and unloading the entire contents of the dock conveyor before shifting the boom back towards the stern of the ship (towards the approach conveyor). This is due to the fact that as the boom is moved from one bin to the next, the transfer point from the dock conveyor to the boom must also shift to feed the boom at its new location. This shifting is typically carried out by incorporating what is known as a tripper system along the dock conveyor. The tripper system is a device that uses a set of idlers and pulleys to introduce an overhang or ripple into the belt. The cargo material on the dock conveyor separates from the conveyor as it passes over the overhang or ripple. The cargo material which separates from the dock conveyor is then received by the boom, which then transports the cargo material to the cargo bin.

Thus, the tripper mechanism must be shifted along the dock conveyor as the system shifts the loading to successive cargo bins. This movement of the tripper system is a relatively simple procedure as long as the boom moves in one direction along the runway. However, a problem arises when the direction of motion of the boom must be reversed. When the direction of motion of the boom is reversed the entire dock conveyor must be unloaded. The unloading of the dock conveyor requires that the delivery of material to the system be stopped; which results in a reduction in the average loading rate of the system.

Figure 1:
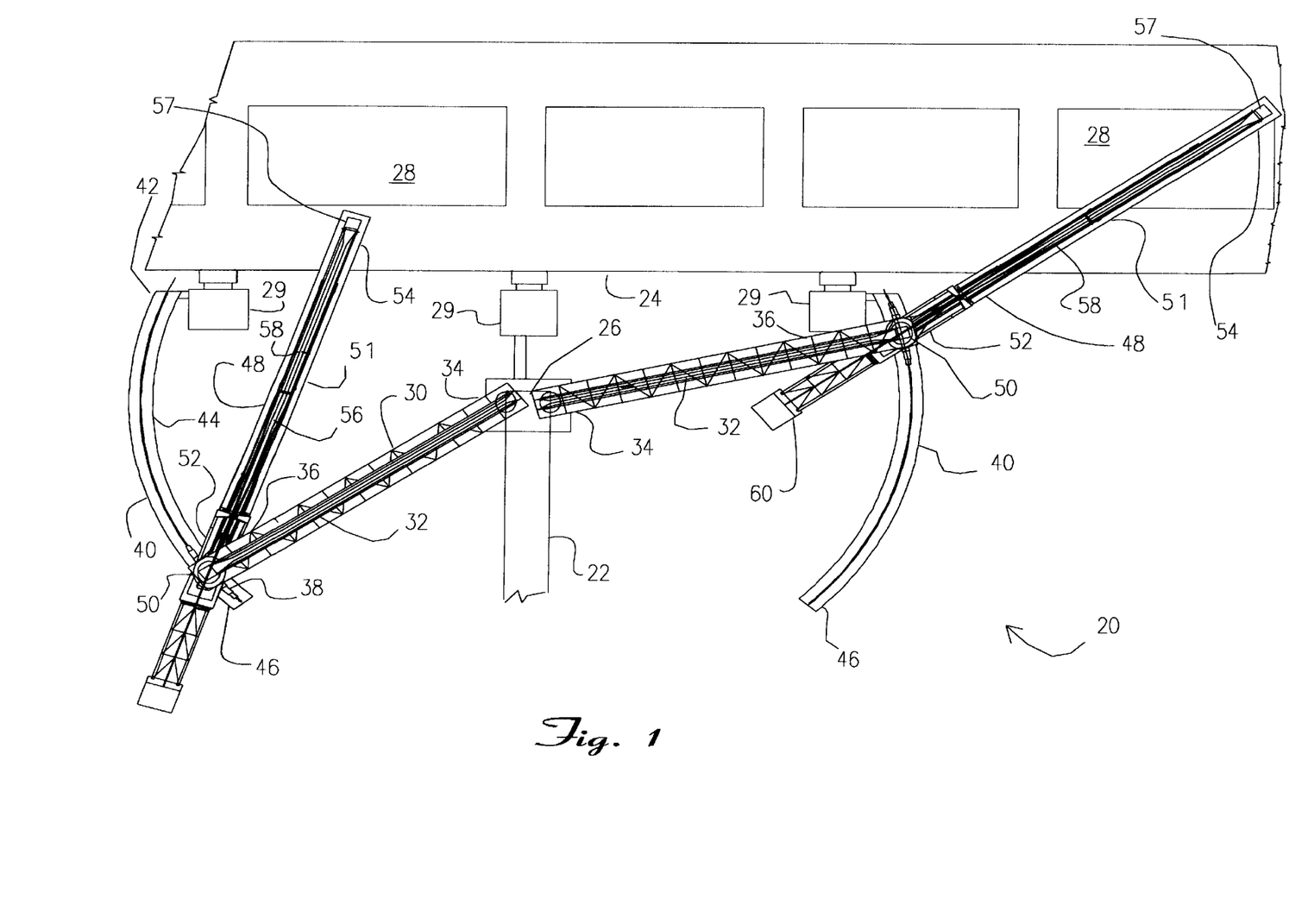
FIG. 1 is a top plan view of a preferred embodiment of the invention while loading a ship.
Figure 1A:
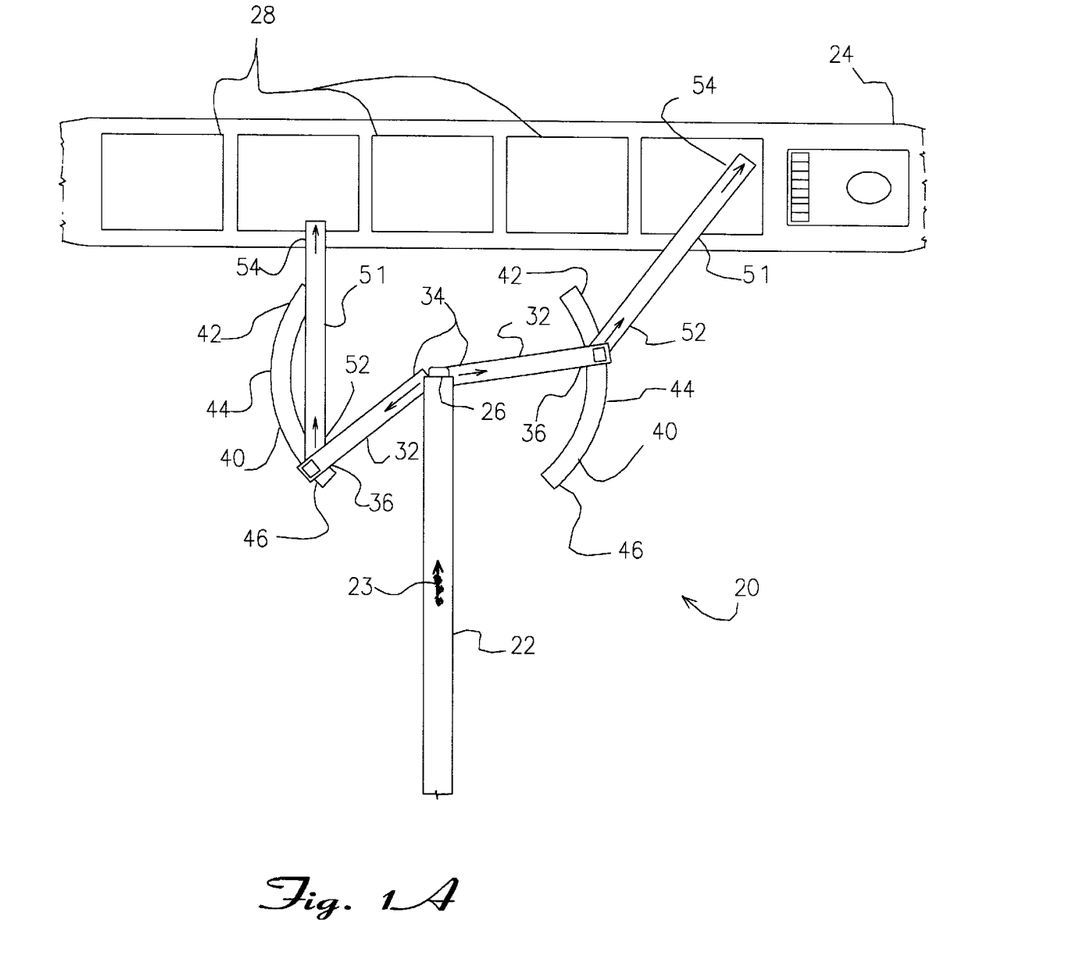
FIG. 1A is a schematic, plan view of a preferred embodiment of the system while loading a ship.
Figure 1B:
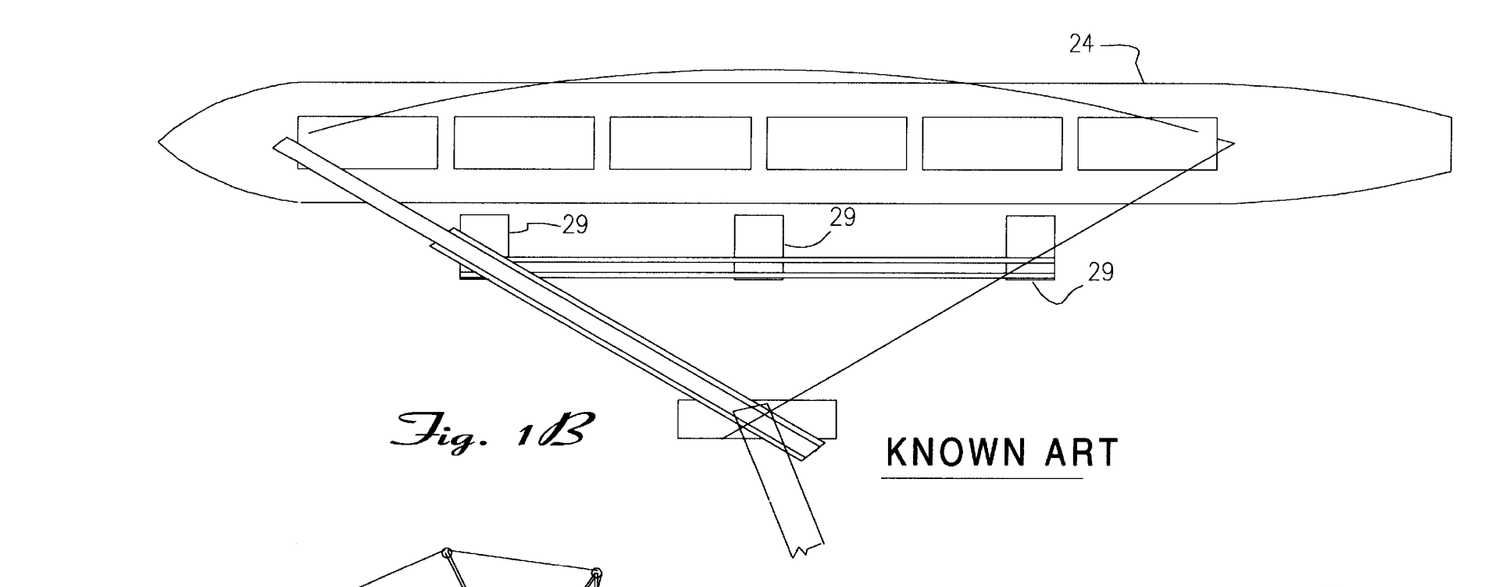
FIG. 1B is a plan view of a known linear loader.
Figure 1C:
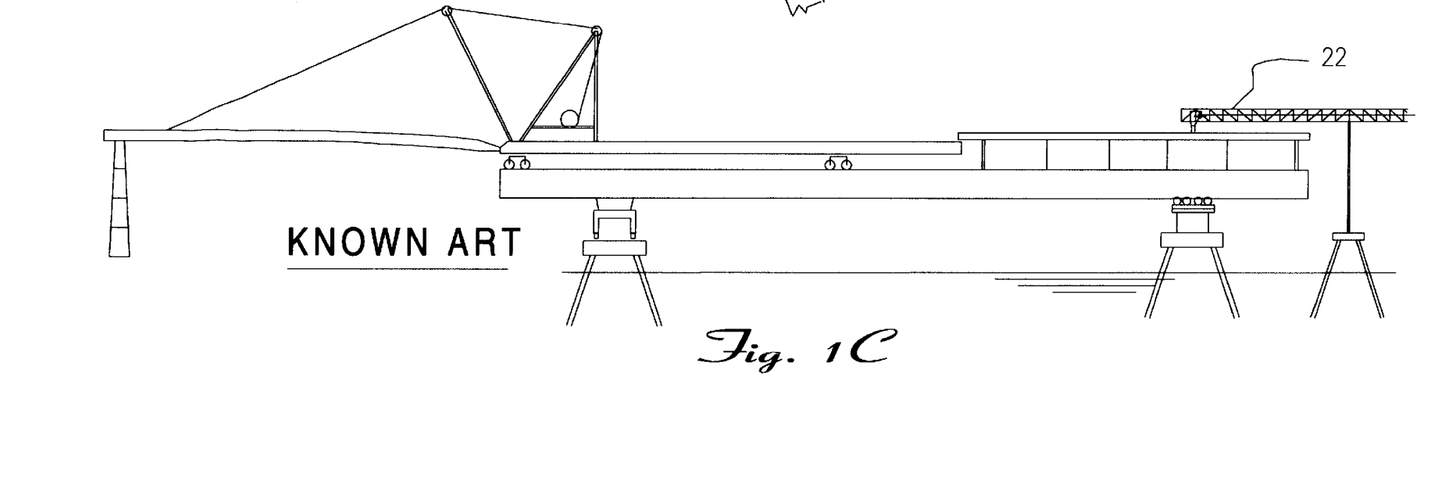
FIG. 1C is a side view of the loader shown on FIG. 1B.
Figures 1D, 1E:
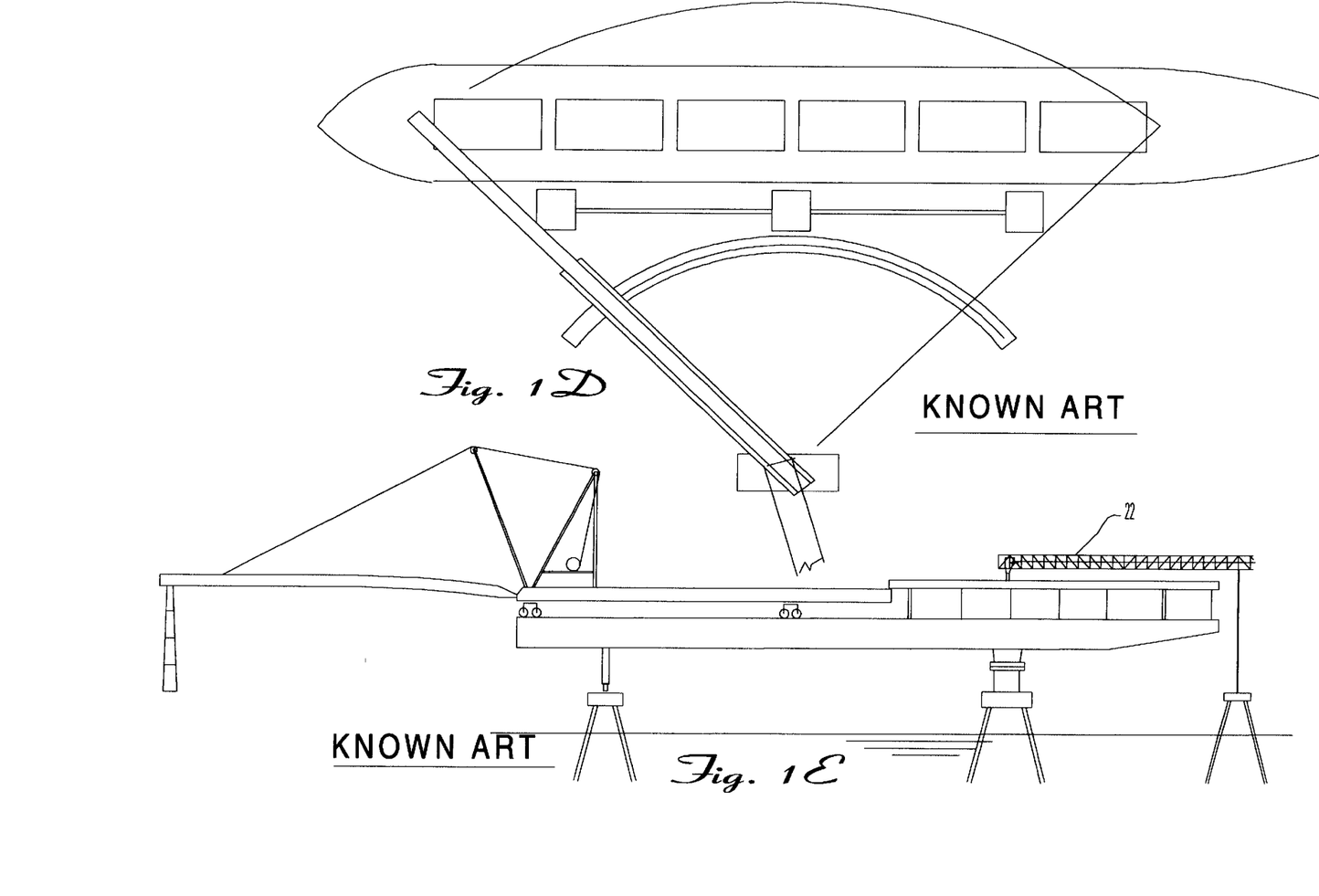
FIG. 1D is a top plan view of a known quadrant loader.
FIG. 1E is a side view of the loader shown on FIG. 1D.

The quadrant shiploader system, illustrated on FIGS. 1D and 1E, was an advancement over the traveling shiploader system in that it results in a substantial reduction in the marine structure requirements for its operation. The quadrant system uses a pivoting bridge of fixed span to distribute the cargo to the ship's cargo bins. With the quadrant shiploader, one end of the bridge is secured at a location where it can receive cargo from an approach conveyor. The mid section of the bridge is supported by a carriage system that rides over an arched runway. The second end of the bridge is cantilevered from the runway, with its boom cantilevered over the ships to be loaded, and thus serves for delivering cargo to the ship's cargo bin. An example of a shiploader that is similar to the quadrant type loader is taught in U.S. Pat. No. 4,082,181 to Berthold et al. Due to the similarities of the Berthold device to the quadrant type loaders, the Berthold device suffers from the same limitations as the quadrant loaders.

In order to load a ship with the quadrant loader, the ship must be moored in a manner that the center of the cargo bin area or the length of the ship is substantially normal to a line that extends from the center point of the cargo bin area or length of the ship to the pivot point of the bridge. It will become apparent that this arrangement is disadvantaged in that the sweep of the bridge causes the discharge of the boom to follow an arch, while loading a ship that has a straight, long hull. Thus, to load the ship's cargo bin, a quadrant loader must provide for adjustment of the combined length of the bridge and boom, so that the discharge of the boom follows a substantially straight path. The feed conveyor or system of the quadrant loader also has to be stopped every time the direction of shifting is to be reversed. (However the conveyor system does not need to be emptied.) Moreover, due to the fact that the runway support of the bridge and boom sweeps to and from the ship, the quadrant loader requires the longest reach, or cantilevering of the boom, for reaching the corners of the cargo bins, as compared to known loaders. However, while the quadrant loader has limitations concerning its reach of the bins, it generally produces higher average loading rates due to more efficient shifting from one bin to the next.

The slewing traversing shiploader is simply a traveling type shiploader with an additional pivot point, or slewing bearing, mounted on a carriage that rides on a runway that is parallel to the pier or docking area. This device combines the advantages and disadvantages of the quadrant loader and the traveling loader. Thus the mechanisms of the slewing traversing loader are somewhat more complicated than the mechanisms involved for each type of system alone.

An example of a slewing traversing type loader is taught in U.S. Pat. No. 3,499,522 to Novak. It follows from the discussion above that the Novak device, while incorporating the advantages of the quadrant and the traveling loader, suffers the disadvantage of cost, moderate average loading rates, and marine structural requirements of the traveling loader. Specifically, a significant disadvantage of the Novak device is that it requires the construction of two separate piers, one for an arched runway and one for a straight runway.

An approach at correcting the disadvantages of the quadrant shiploading system is taught in U.S. Pat. No. 3,856,159 to Soros. The Soros invention is now commonly known as the linear type loader since the bridge is supported over a straight runway which parallels the ship to be loaded. The linear loader is equipped with a variable span bridge. The land side of the bridge is allowed to shuttle on top of a slewing bearing, and the water side allowed to travel along a straight runway. This arrangement requires a shorter unsupported boom span to reach the corners of the cargo bins than is required by the quadrant type loaders. A linear type loader has been illustrated on FIGS. 1B and 1C.

One important disadvantage of the linear loader is that it requires a bridge adjustment mechanism in order to provide discharge of the cargo along a straight line. This adjustment mechanism means a substantial increase in the weight of its pivoting end. (Its overall weight, however, is somewhat less than the weight of a comparable quadrant loader.)

Yet another disadvantage of existing systems, such as the linear and quadrant systems, is that a traveling shuttle and boom conveyor is supported by a slewing bridge with large span and additional long cantilevers on both ends. The bridges are subjected to constant stress reversals induced by heavy dynamic loads of the boom and traveling shuttle. In case of the Linear loader this is further magnified by the fact that the bridge itself travels above the rear pivot. Therefore the bridges of both types of shiploaders have to be designed with very low depth to span ratio generating deep heavy sections with substantial weights.

There remains a need for a shiploading system that can be erected with short lead times. Thus, there remains a need for a shiploader system that can be assembled from non-specialty components and yet produce high average loading rates for small as well as large vessels.

There remains a need for a shiploader system that makes more efficient use of standard shiploading or materials handling equipment. More specifically, there remains a need for a shiploader system that reduces the size and amount of marine structure, while producing high average loading rates with readily available components.

Still further, there remains a need for a shiploader system that takes advantage of proven, readily available components to produce a versatile system that can accommodate large vessels as well as small vessels.

There remains a need for a shiploading system that requires low capital costs and takes advantage of systems with proven reliability to produce a shiploading system that can operate at higher average loading rates than had been previously known.

SUMMARY

It has been discovered that the problems left unanswered by known shiploading systems can be solved by providing a shiploading system that transports material from an approach conveyor and on to a ship, and includes the following elements:

a) at least one slewing boom on a runway that extends away from the vessel to be loaded; and b) an orbiting (traveling and slewing) bridge that transports material from the approach conveyor to the slewing boom.

A highly preferred embodiment of the invention uses a pair of slewing booms, each on a runway that extends away from the vessel to be loaded, each connected to an orbiting bridge that extends from the approach conveyor. This arrangement allows one to include a chute, feeder or other distribution means that can selectively direct the flow of material from the approach conveyor on to one of the bridges. It has been discovered that with this arrangement one may keep one bridge and slewing boom operating at all times. This is due to the fact that by alternating the bridge and boom that is delivering material to the vessel one can allow one boom and bridge to deliver material while the other boom and bridge are being positioned over the next cargo bin to be loaded. It will be appreciated that by alternating the boom and bridge that is delivering material one can achieve a system that does not require the stopping of the approach conveyor in order to change the cargo bin being loaded, thus producing higher average loading rates.

Thus, an important new result achievable with the novel structure taught herein is that the disclosed arrangement results in improved efficiency of existing components to produce higher average loading rates than could be achieved with known arrangements.

An important advantage of the instant invention is that the system can be assembled using existing, proven technology. It has been discovered that the geometry of the runway arrangement, and resulting shiploader system allows the use of smaller and shorter supporting marine structures and handle higher average loading rates as compared to known systems.

Moreover, the bridge and boom mechanisms required for achieving economical loading rates for all ship sizes are of a size that obviate the need to purchase special order or custom mechanisms.

In a highly preferred embodiment of the invention the loading system itself consists of two units, one being a mirror image of the other. In this embodiment the two runways are each turned ninety degrees (one counter clockwise and one clockwise) as compared to the conventional quadrant loader. In other words, as compared to the quadrant loaders, the runways of the instant invention commence at an area proximate to the ship, whereas in the quadrant loader designs, and its variations, the runways are designed to be almost tangent to, or parallel to, the ship.

An important new result achieved with the novel structure taught herein is that because in the instant invention the runways actually curve to and from the ship, the length of the runway is determined by the width, instead of the length, of the ship, thereby facilitating a shorter runway. This is in sharp contrast to systems that rely on a runway that is parallel to the moored position of the ship, where the runway length of the shiploader is determined by the length of the hatch coverage, or ship length. The typical length to width (beam) ratio of a ship being between 5 or 6 to 1.

The structure of linear and quadrant shiploader systems, as well as the marine steel or concrete structures required to support these systems, is significantly heavier than those of the instant invention. In both the linear and quadrant shiploader systems a traveling shuttle and boom conveyor is supported by a slewing bridge with a large span and long cantilevers on both ends. The bridges of these systems are subjected to constant stress reversals induced by heavy dynamic loads from the traveling shuttle and boom which must reverse its direction of motion in order to give uniform coverage over the length of the ship. In the case of the linear loader system the problem of stress reversals is further magnified by the fact that the bridge itself travels above the rear pivot. Therefore, the bridges in both the linear and traveling systems have to be designed with a very low depth to span ratio in order to achieve the required strength to tolerate these stresses. These deep, heavy sections result in a very heavy structure which must in turn be supported by a correspondingly heavy marine structure. As can be appreciated from this disclosure, the structure and arrangement of the instant invention eliminates the loads associated with the reversal in direction of motion.

Due to the fact that the boom of the instant invention does not have to engage in the same traveling or shuttling movements as required by the systems in the prior art, the instant invention obviates the stress reversals in the bridge structure. Therefore, the bridges in the instant invention supporting only a stationary transfer conveyor, and thus are not subjected to traveling dynamic loads and stress reversals. This allows a bridge design of high depth to span ratio and light weight open truss type construction. This results in a light weight shiploading system which requires significantly smaller marine structure than was required by the prior art.

Most loads generated by the superstructure (boom, pylon, counterweight etc.) of the instant invention are transmitted directly into the runway and its supporting marine foundations, facilitating the construction of a light shiploader bridge and substructure. Moreover, in the preferred embodiment of the invention, the slewing boom is provided with a counterbalance weight. The counterbalance weight results in even loading of the carriage, which in turn permits the use of a carriage with a relatively small number of wheels, as well as a small wheel base, which will require a narrow, smaller, lighter runway. The reduction in the size and weight of the runways produces a reduction in the size of the required marine structure.

Still further, since the instant invention uses a boom that is balanced, it does not introduce a bending moment into the bridge structure. In other words, known shiploading systems typically use booms that are cantilevered from a moving support. Thus, the moving support must be able to react the forces to support the cantilevered boom. The reactions from supporting the boom are transmitted from the moving support to the bridge structure on which the moving support rides. It has been found that the bridge structure is exposed to bending stress reversal due to the fact that the moving support changes its position along the bridge structure in order to reach the different locations on the ship's hatches. Thus, the bridges that support these moving supports must be designed to withstand these stress reversals, which typically means including large, deep girders or beams. These large beams will increase the total weight and cost of the installation or system, since the marine structure that supports the shiploading system must be able to support the bridge and other components of the shiploading system.

Still yet another advantage of the instant invention is that the bridges do not need cantilevered extensions, and thus result in smaller overall structures.

Thus it will be appreciated that the instant invention allows coverage of large spans with two conveying units that are smaller than those required by configuration in the prior art.

It will be appreciated that by using runways that extend away from the vessel one can provide a system that requires a shorter reach to fill the ship's hatches than were required by configurations in the prior art.

Still further, it will be understood that yet another important result achieved with the instant invention is that the system requires shorter runways, due to the fact that the length of the runways of the instant invention is determined mainly by the ship's beam and not by the hold's length.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 9A is a side view of the variation shown on FIG. 9.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIGS. 1 and 1A, where a loading system for transporting material to a desired location has been shown. The preferred embodiment of the system, which will be referred to herein as a shiploader 20, has been illustrated while transporting material from an approach conveying means, which in a preferred embodiment is an approach conveyor 22 on to a ship 24. It is important to note that while the disclosed invention is particularly useful for loading ships, it is contemplated that the instant invention may be equally useful in loading any other elongate transport device or area, such as a field on which heap leaching operations are to be carried out. Moreover, while the preferred embodiment shown and discussed herein is designed for transporting dry, fungible materials, it is also contemplated that the system discussed herein may be used to support pipelines that deliver slurries, such as concentrates, to a ship.

Referring to both FIGS. 1 and 1A, it can be seen that the approach conveyor 22 may be used to deliver fungible materials 23, such as ores, grains, and the like, from a port and to a moorage area where the loading system is mounted. The approach conveyor 22 will carry the materials 23 from land and on to the shiploader 20. The materials 23 are transferred from the approach conveyor and on to the shiploader 20 through a discharge point 26 which may also include a chute or other means for controlling the delivery of the materials 23 to the shiploader 20. The loading system will be particularly well suited for delivering and distributing the material 23 to a set of cargo bins 28 on a ship 24 which has been moored against a fixed mooring structure 29, which includes tie-downs, as well as mooring and breasting dolphins with fenders.

To load the ship 24, the ship will typically be secured, or docked, against the mooring structure 29. The mooring structure serves to maintain the ship at a predetermined longitudinal orientation relative to the shiploading system. Once the ship has been docked at a desired predetermined position, the shiploading system will then begin to deliver the cargo materials 23 to the ship's cargo bins 28. Thus, as will become clear from the discussion hereinbelow, the loading of the ship with the system taught herein does not require the shifting of the position of the ship as was required by fixed shiploaders.

As shown on FIGS. 1 and 1A, a highly preferred embodiment of the shiploader 20 includes a bridge 30 which supports a bridge conveyor means 32 which includes a first end 34 and a second end 36. The first end 34 of the bridge conveyor 32 is pivotally positioned proximate to the discharge point 26 of the approach conveyor 22, so that material 23 being delivered by the approach conveyor 22 may be deposited on the first end 34 of the bridge conveyor 32.

Figure 2:
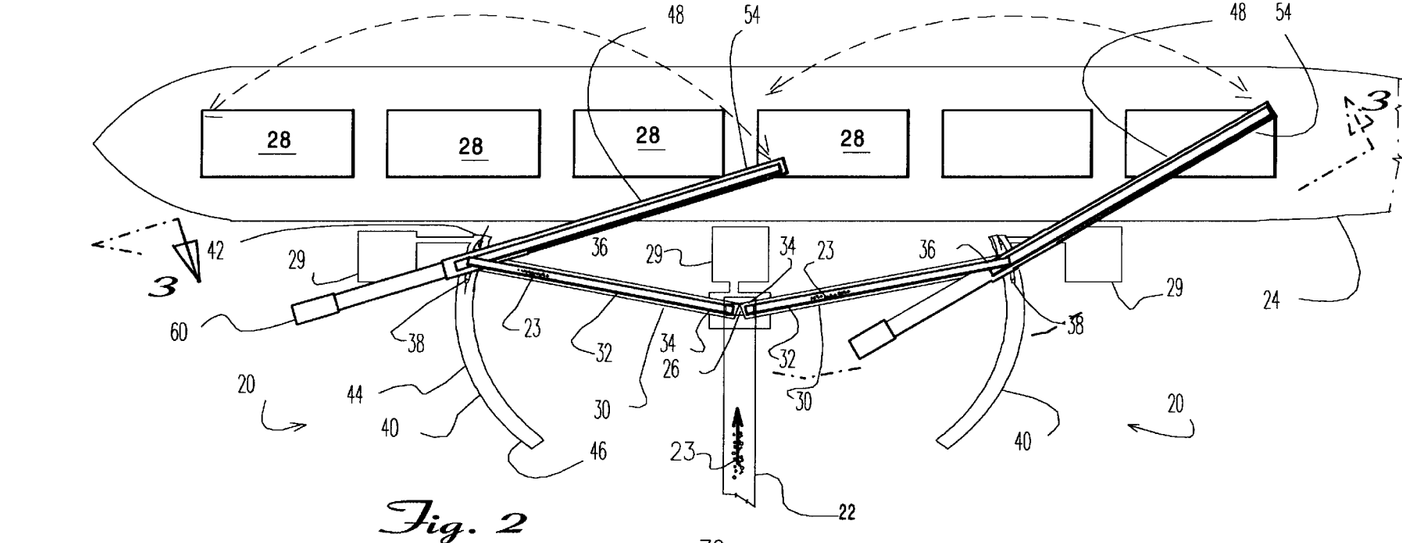
FIG. 2 is a top plan view of a highly preferred embodiment of the invention, the view omitting the schematic outline of truss structure shown on FIG. 1.
Figure 2A:
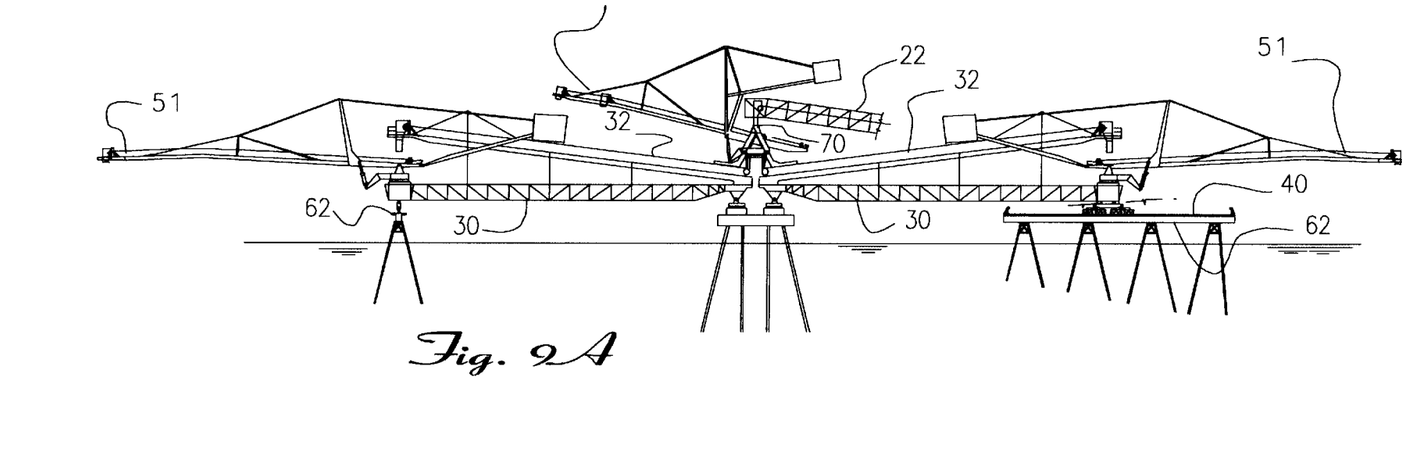

As shown on FIG. 2, the bridge conveyor 32 is preferably a belt type conveyor, but it is contemplated that it may comprise a conveyor means such as a tube conveyor, pneumatic lift conveyor, or other known conveying means. As indicated above, the approach conveyor terminates at a discharge point 26, from which material 23 is transferred to the first end 34 of the bridge conveyor 32. Once the material 23 has been transferred on to the first end 34 of the bridge conveyor 32, it is then transported by the bridge conveyor 32 to the second end 36 of the bridge conveyor 32.

Figure 3:
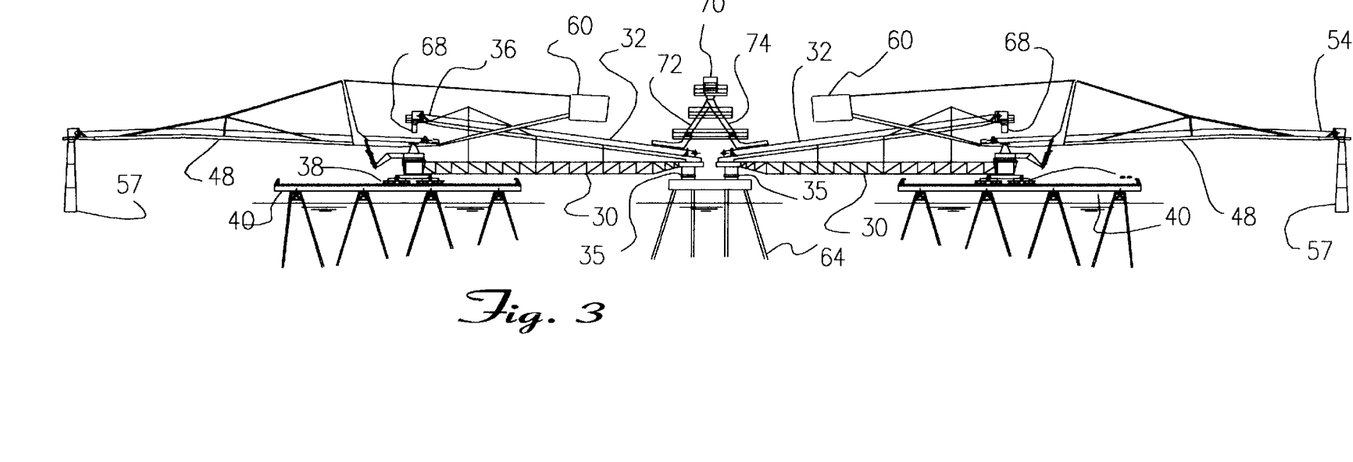
FIG. 3 a hybrid view, looking out towards the sea (water) from shore, of the embodiment shown on FIG. 2. The view is a hybrid view in that the boom and runways have been shown as viewed from a direction as indicated by the section arrows on FIG. 2 for clarity.

Turning now to FIG. 3 where it has been shown that the second end 36 of the bridge conveyor 32 is mounted on a carriage 38, which allows the second end 36 to move along a runway 40. Thus the bridge 30 may be fairly said to "orbit" about the first end 34 of the bridge conveyor 32. It is of interest to note that the motion of the bridge 30 in the disclosed invention will not travel to a position that is normal to the vessel and at the same time be able to deliver materials towards the vessel, as is done with the quadrant loaders as shown on FIG. 1D. The runway 40 includes a first end 42, a mid portion 44, and a second end 46. The first end 42 of the runway 40 is positioned near the mooring structure 29, so that the first end 42 of the runway 40 is closer to the ship 24 than the mid portion 44 of the runway. This arrangement for the runway allows the second end 36 of the bridge conveyor 32 to be moved along the runway 40 such that the second end 36 of the bridge conveyor 32 can be moved towards as well as away from the ship 24 which has been positioned next to the mooring structure 29.

Over the carriage 38 is also mounted at least one slewing and conveying means, which in a highly preferred embodiment is a slewing boom 48 made from a stacker-like structure. As will be appreciated from the discussion herein, stackers are proven effective for conveying materials such as the fungible materials which are typically transported by ship or train. Moreover, stackers can use an open truss type structure, which employs a counterweight together with a vertical central mast or column that retains flexible suspension system made from tension members that extend to one or both ends of the boom. The structure of these booms may be very light in comparison to loading devices such as the linear loader when working at similar average loading rates. However, stackers have been typically used for delivering bulk materials to and from stockpiling areas on land. Thus, as will become apparent from the discussion herein, the instant invention allows use of stacker type mechanisms and structure for delivering bulk materials to the cargo bins 28.

As shown on FIGS. 1, 1A, 2–4 and 5, the slewing boom 48 is pivotally supported near the second end 36 of the bridge conveyor 32 on a slewing bearing 50 which is mounted over the carriage 38. The slewing boom 48 of the preferred embodiment includes a slewing boom 51 which includes a first end 52 and a second end 54. The first end 52 of the slewing boom 51 is positioned near the second end 36 of the bridge conveyor 32 in a manner that allows the bridge conveyor 32 to deliver and transfer material 23 to the first end of the slewing boom 51. It is important to note that the arrangement shown in FIGS. 1, 2, and 3 includes slewing booms 48, which include a counterweight 60. The use of the counterweight 60 allows the use of a balanced boom which, as explained earlier, is not simply cantilevered or held down on a moving support near the area at which the conveyor on the boom is loaded, as is done with the linear loader shown on FIGS. 1B and 1C or the quadrant loader shown on FIGS. 1D and 1E, or other systems that have to react to traveling loads. By balancing the slewing boom by means of a counterweight one obviates the need for providing structure that reacts the loads imposed by the boom used to deliver the bulk materials to the cargo bins of the ship. Thus by providing an orbiting bridge and a slewing boom one may use lighter, open truss type, structure to support the conveyor belt on the slewing boom as well as on the orbiting bridge.

Many of the designs of known devices allowed linear motion of the boom that carries material to ship. This linear motion necessitated heavier, more complicated structure than is required by the embodiments of the instant invention which will preferably use motion along arcs to obtain coverage of the area over the ship. The geometry of the orbiting and slewing system taught herein will allow constant adjustment of conveying means to deliver the materials to the corners of the cargo bins as well as along the edges of the cargo bins.

In the embodiments shown on FIGS. 1, 1A and 3 the transfer of material 23 from the bridge conveyor 32 to the slewing boom 51 may carried out by simply depositing the material from the second end 36 of the bridge conveyor 32 through a chute 68. The slewing boom 51 of the preferred embodiment will also contain a conveying means 56, which in a preferred embodiment includes a belt type conveyor 58. The conveying means 56 includes a first end 59 and a second end 61. It should be noted that one of many well known material transfer mechanisms may be used in place of a belt conveyor. The conveying means 56 will transport material over the slewing boom 51 to the second end 54 of the slewing boom 51, where, in a preferred embodiment, a chute 57 accepts the material 23 from the conveying means 56 and directs its delivery into the ship's cargo bins 28.

Thus an examination of FIGS. 1, 2 and 3 reveals that by positioning of the runways 40 such that the closest point of the runway 40 is the first end 42, one provides a structure where the bridge will not be required to be aligned with the approach conveyor during its range of motion. In other words, the bridge will not have to be at a right angle to the moored vessel in order to load the vessel.

It will become apparent to those skilled in the art that the use of light, truss type structure with the slewing boom 48 one can also reduce the size of the marine structure needed to support the slewing boom 48. Thus as shown in FIGS. 4 and 5, it is contemplated that in embodiments that have been designed for loading smaller vessels, such as those in 50,000 DWT range, one may simply use light marine structure to support the runway 40, the runway 40 being supported on support columns 64.

Figure 4:
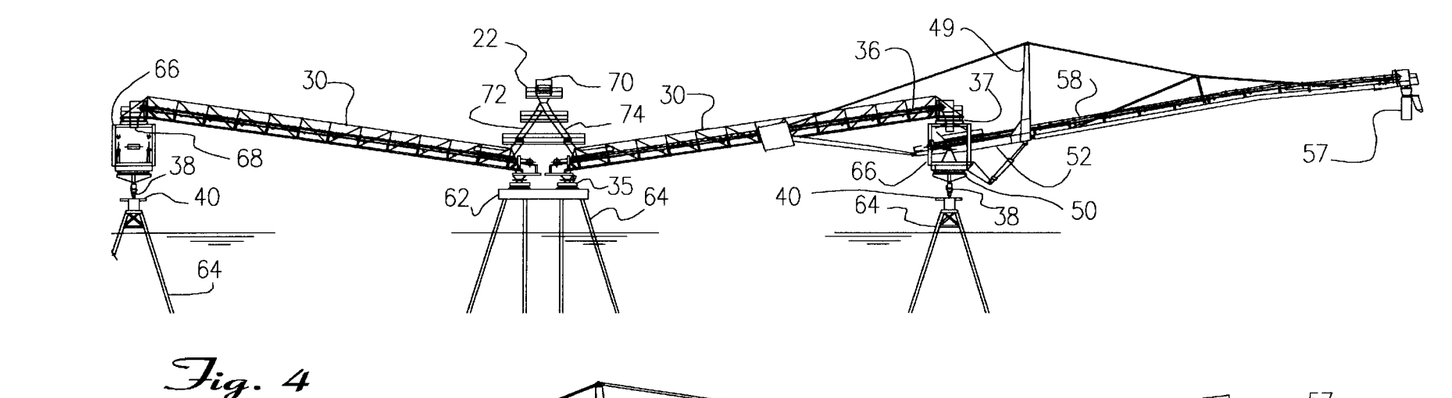
FIG. 4 is an end view of an embodiment of the system, the view taken looking towards shore, and looking directly into (into the conveyor) one of the booms.
Figure 5:
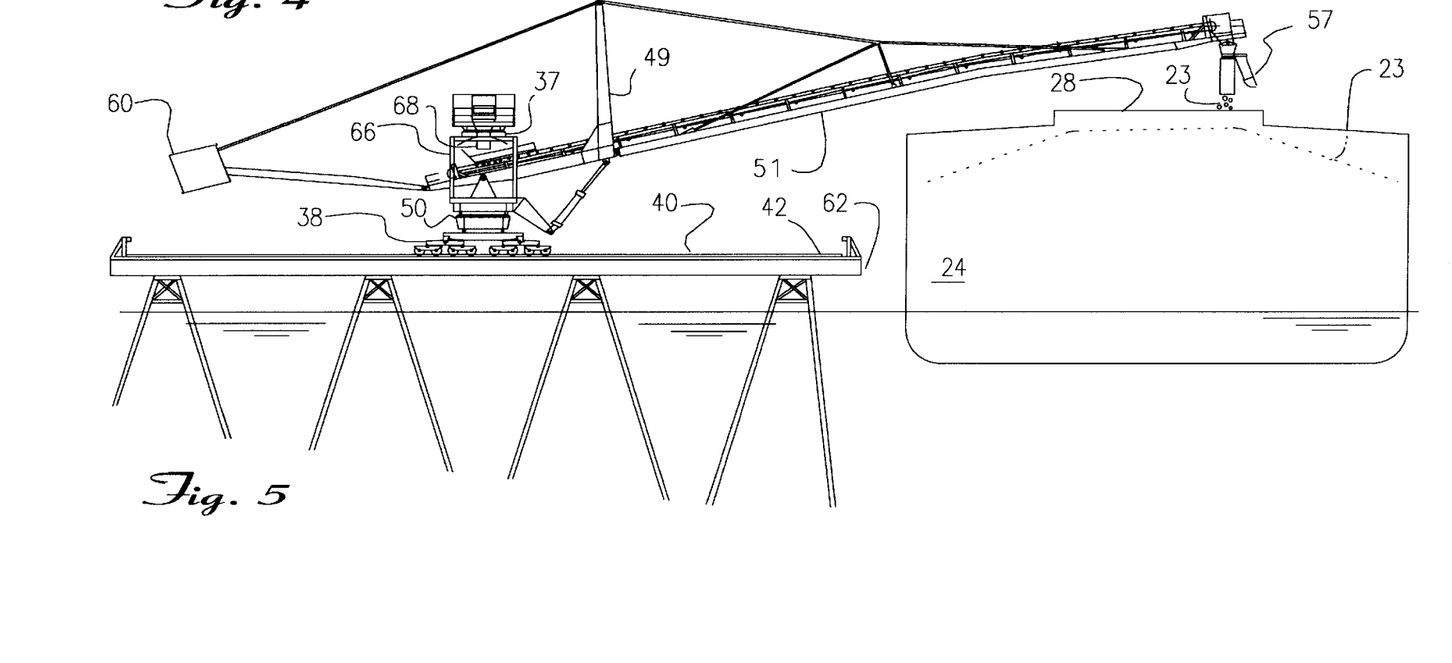
FIG. 5 is a side view of an embodiment slewing boom used with the embodiment shown in FIG. 4.

Turning now to the embodiment illustrated on FIGS. 4 and 5, where the second end 36 of the bridge conveyor 32 has been mounted on a frame 66 which supports the second end 36 of the bridge conveyor 32 on a slewing bearing 37. This is a variation from the embodiment illustrated in FIGS. 1, 2 and 3, which show the bridge conveyor 32 supported entirely by the truss structure of the bridge 30. At the second end 36 of the bridge conveyor 32 shown on FIGS. 1, 2, and 3 is a chute 68 which delivers the material 23 to the first end 52 of the slewing boom 51.

Shown on FIG. 4 is an alternating chute 70 which has been mounted at the discharge point 26 of the approach conveyor 22. The alternating chute 70 includes a first delivery chute 72 and a second delivery chute 74. It is important to note that while the alternating chute 70 has been illustrated with the embodiment shown on FIG. 4, the delivery of material to the slewing boom may be accomplished by means of feeders or other distribution means that allow selective delivery to a desired orbiting bridge. The alternating chute 70 allows delivery of material through the first delivery chute 72, the second delivery chute 74, or both delivery chutes at a time. It is preferred that an alternating chute 70 be used in order to provide a system that allows alternating use of bridges 30 and cooperating slewing booms 51.

It has been found that the use of the alternating chute 70 increases the average loading rate of the system by allowing the loading of one cargo bin with one bridge and one slewing boom, while another bridge and slewing boom is moved to a desired cargo bin 28. Thus, with at least two bridges and mating slewing booms one can achieve the continuous use of the system while loading a vessel, without requiring the stopping of the approach conveyor when shifting the cargo bin being loaded. Thus it is contemplated that while one bridge and slewing boom is being used to deliver material to a cargo bin, another bridge and slewing boom could be shifted from one cargo bin to the next cargo bin to be loaded.

Thus it will be clear that the shiploader 20 as taught herein obviates the need to stop the approach conveyor 22 when shifting the loading from one cargo bin 28 to another. Moreover, will be appreciated that the loading of the vessel may be achieved in a safer manner with the instant invention. The increased safety is achieved due to the fact that the disclosed system allows simultaneous loading of cargo bins 28 near the bow of the ship while loading cargo bins near the stern of the ship. This results in a balanced loading of the ship, reducing the risk of problems such as bottoming out in shallow ports by placing too much load near stern of the vessel before the bow is loaded.

Still further it will be appreciated that by combining an orbiting bridge 30 with a slewing boom 51 one produces a shiploading system that can easily reach almost any area over the cargo bins 28 while loading the cargo bins 28. This allows the user to achieve uniform, level loading of each cargo bin 28 by moving the slewing boom 51 to deliver the cargo to different areas of the cargo bin 28. This loading reduces the likelihood of producing generally cone shaped piles in the carbo bin. The reduction of cone shaped piles greatly reduces the possibility of shifting of the load during the sea voyage and reducing the danger of capsizing due to a sudden shift of the load or due to the a distance between the center of gravity of cargo or loaded shipment and the center of gravity of the ship.

Figure 6:
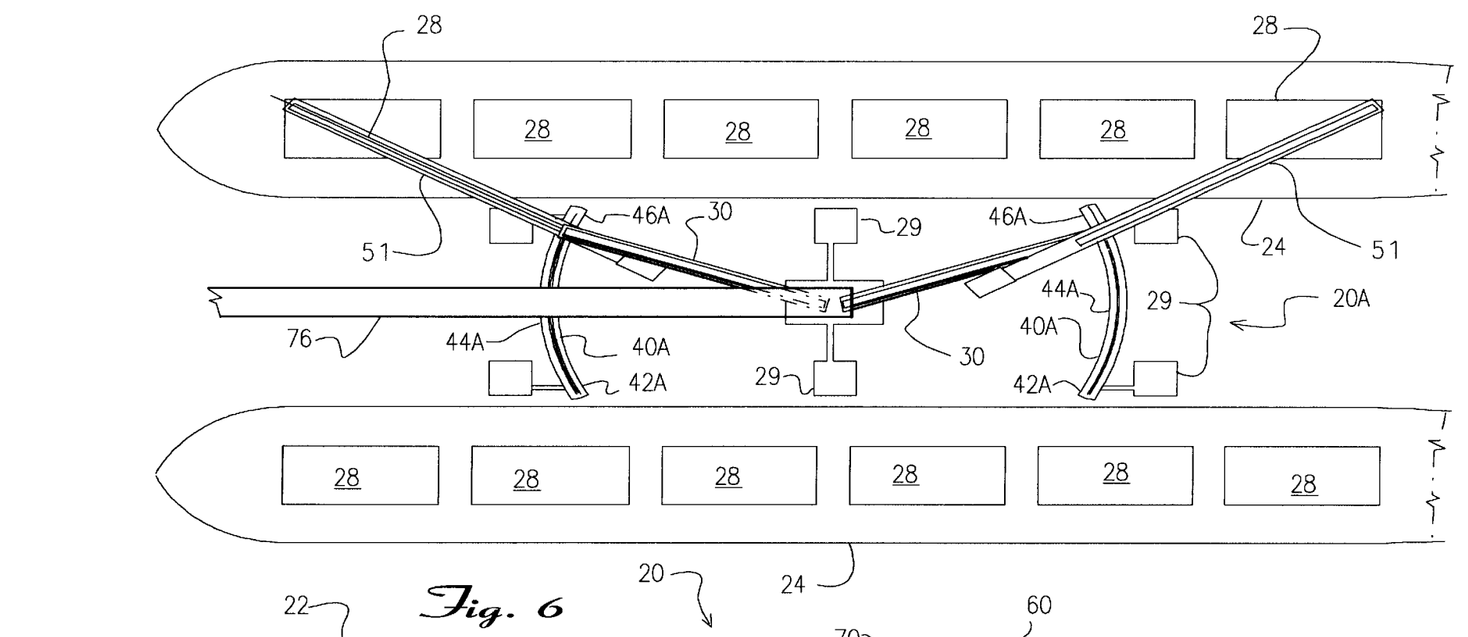
FIG. 6 is a top plan view installed in a finger pier type (illustration is not a true finger pier) application for loading ships moored on both sides of the system.
Figure 6A:
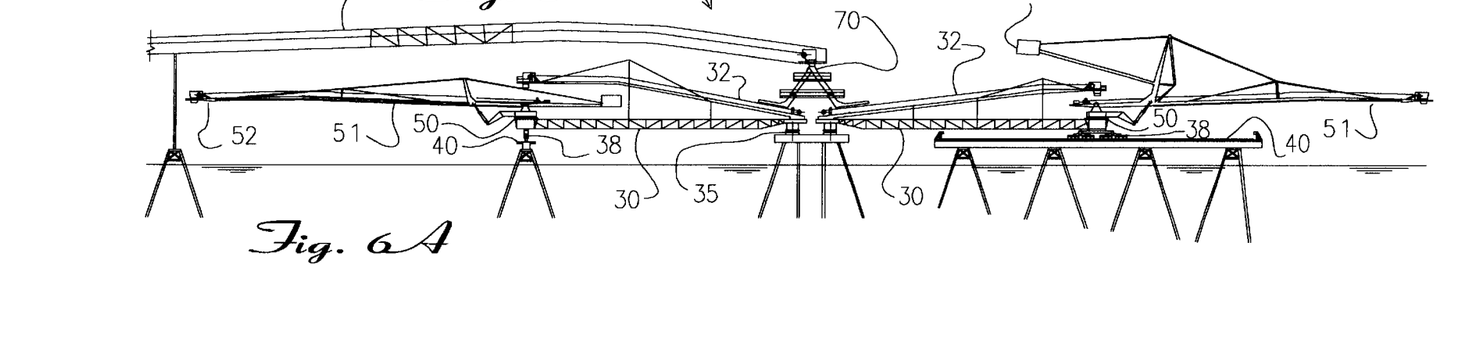
FIG. 6A is a side view of the variation shown on FIG. 6.

From an examination of FIGS. 6 and 6A it will be understood that it is contemplated that the disclosed shiploader system taught herein may be used with an approach conveyor 22A is mounted on structure that functions like a finger pier application and which will be referred to herein as a finger structure 76. The ships 24A and 24B are positioned in a generally parallel fashion to the finger structure 76 and the approach conveyor 22. The installation shown on FIGS. 6 and 6A includes a pair of shiploaders 20A, each with a runway 40A, each of the runways 40A includes a first end 42A, a mid portion 44A, and a second end 46A. Note that the first end 42A of each of the runway 40A is the closer to the ship 24 than the mid portion 44A of the runway 40A. The second end 46A of each runway 40A is closer to the ship 24B than the mid portion 44A. As shown on FIG. 6A the approach conveyor 22A is shown extending over one of the runways 40A.

Figure 7:
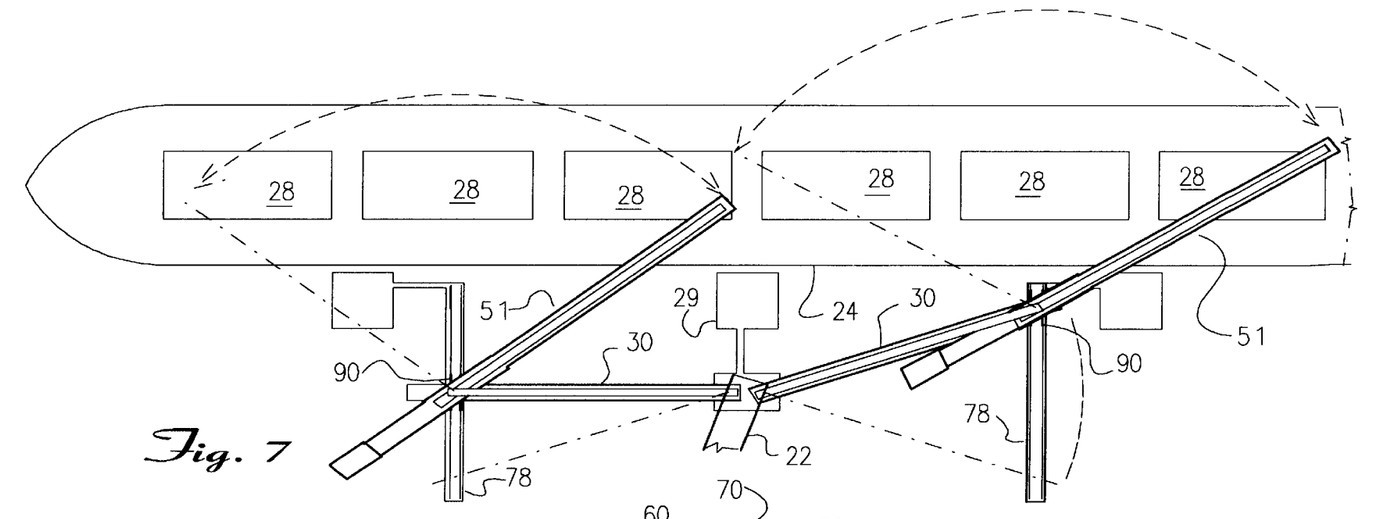
FIG. 7 is a plan view of a variation of the instant invention.
Figure 7A:
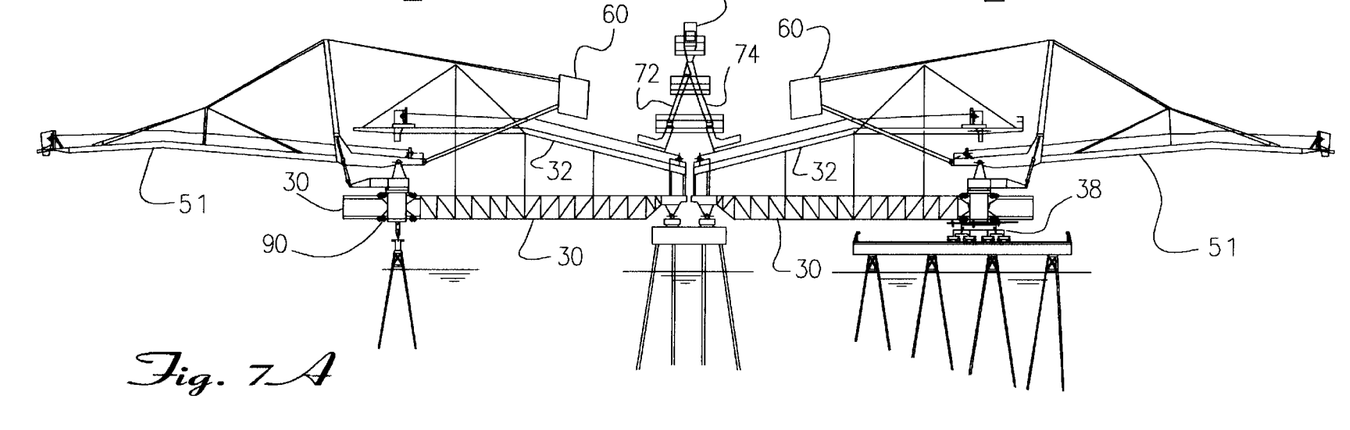
FIG. 7A is a side view of the variation shown on FIG. 7.

A variation of an installation including the shiploading system taught herein is shown on FIGS. 7 and 7A. The installation shown on FIGS. 7 and 7A including a straight runway 78. The straight runway 78 including a first end 80, a mid portion 82, and a second end 84. The use of this embodiment would require that a sliding carriage and sliding head 90 be incorporated at the second end 36 of the bridge conveyor 32. The sliding carriage and sliding head 90 can slide relative to the bridge 30 as well as relative to the runway 78 in order to allow self adjustment compensating for the difference in distance from the discharge point 26 and the first end 80 of the runway 78 and the distance between the discharge point 26 and the mid portion 82 of the runway 78.

Figure 8:
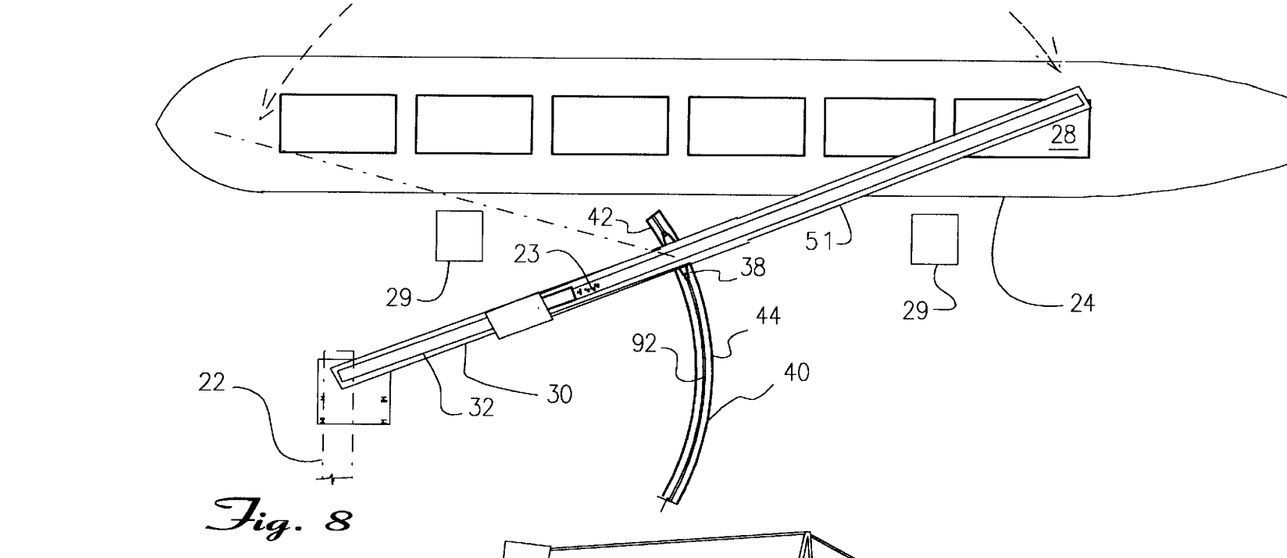
FIG. 8 is a plan view of an installation of the instant invention using only one bridge and one slewing boom.
Figure 8A:
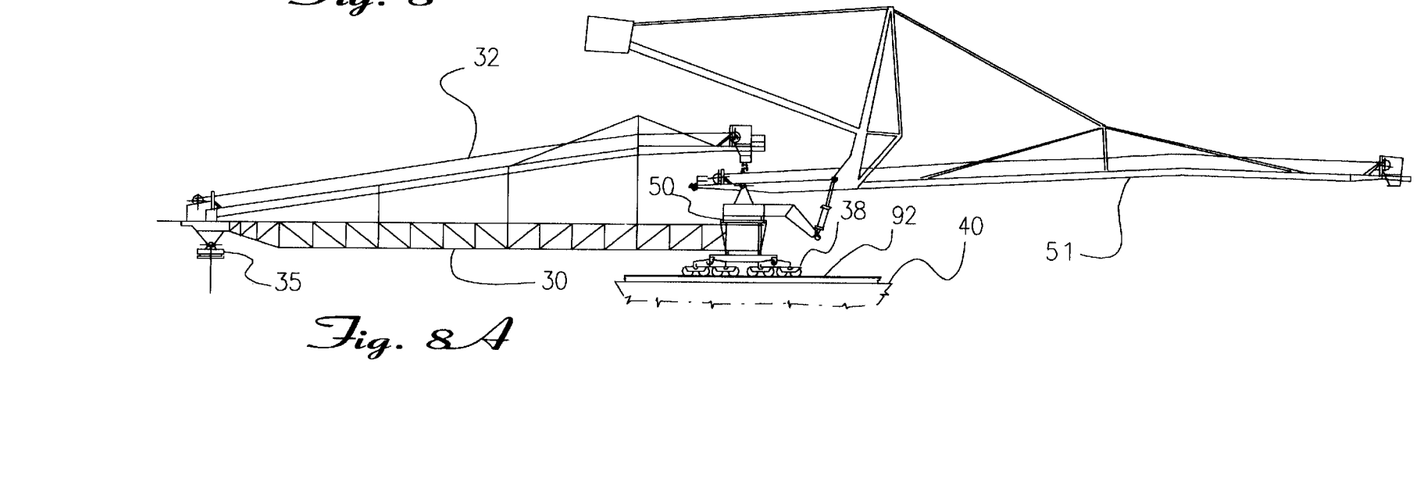
FIG. 8A is a side view of the variation shown on FIG. 8.

Shown on FIG. 8 is a contemplated installation of the shiploading system taught herein which includes a single bridge 30 and accompanying slewing boom 51 and runway 40 constructed as taught herein. The runway 40 and mooring structure 29 being positioned such that the first end of the runway 40 be closer to the ship 24 than the mid portion 44 of the runway 40 when a ship is positioned against the mooring structure 29. This embodiment is particularly useful for installations that are designed for loading small vessels. It should be noted that the use of an installation that incorporates a single orbiting bridge 30 combined with a single slewing boom 51 offers significant advantages that could not be achieved with known devices, in spite of the fact that this type of installation would not use a distributing chute. An important advantage to this installation is that the combination of the orbiting bridge 30 and the slewing boom 51 allows the use of shorter, smaller, lighter structure. The weight of the structure is reduced due to the fact that the loading system may take advantage of proven loading devices with open truss construction as discussed above. The lighter construction in turn results in a system that requires a smaller marine structure to support the mechanical loading systems. This smaller marine structure allows the use of small marine columns that can be erected quickly and easily.

Figure 9:
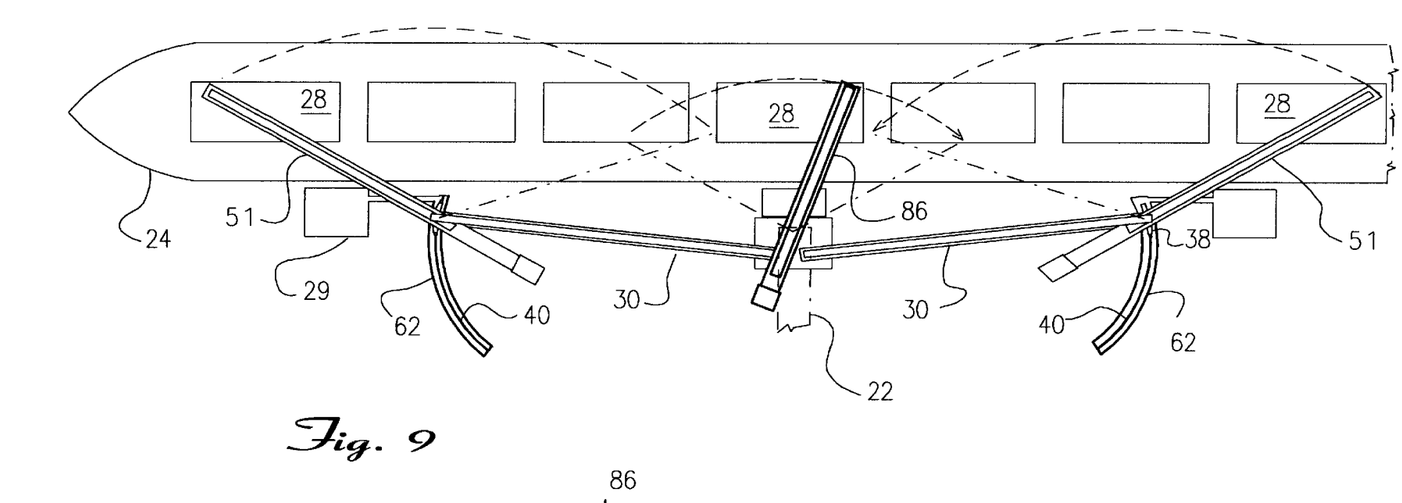
FIG. 9 is a plan view of a variation of the instant invention.

It is contemplated that still another variation to the system taught herein has been shown in FIGS. 9 and 9A, where the system would include a central slewing boom 86, in addition to a pair of bridges 30 and accompanying slewing booms 51. FIG. 9A is an elevational view of the embodiment shown in FIG. 9. The central slewing boom 86 has been added to this embodiment to increase the longitudinal coverage of the system when used to load very large vessels.

Figures 10, 10A:
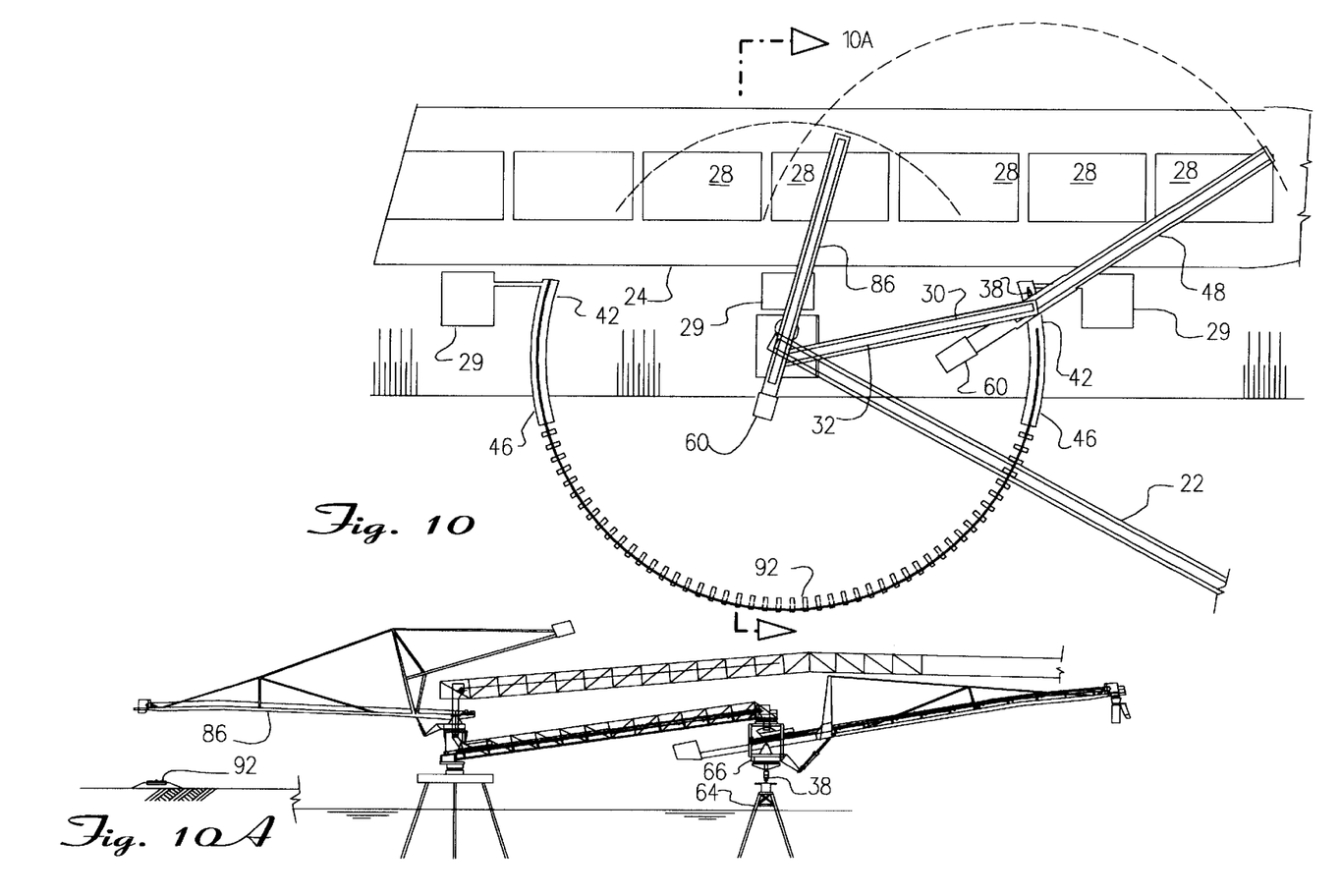
FIG. 10 is a plan view of a variation of the instant invention.
FIG. 10A is a side view of the variation shown on FIG. 10.

Yet another variation to the instant invention has been illustrated in FIGS. 10 and 10A, where the runway 40 extends under the approach conveyor 22. Clearly, this embodiment would require that the structure supporting the approach conveyor be elevated as shown in FIG. 10A in order to allow the bridge and accompanying slewing boom to travel under the approach conveyor. The embodiment shown in FIGS. 10 and 10A is also shown with a central slewing boom 86A.

It is contemplated that the embodiment shown on FIGS. 10 and 10A would be used in installations where, due to favorable geographic conditions, the shiploading system could be mounted next to, and partially on, shore and on two short runways. The embodiment takes advantage of the favorable conditions, which would include deep water next to shore and a small runway, to incorporate a section of land based track 92 for the carriage 38. The track 92 would connect the two sections of runway 40 and allow the use of a single orbiting bridge 30 and a single slewing boom 51 to deliver cargo to a relatively large vessel. It is advantageous to use track over land or pier area since track is relatively inexpensive and easy to build.

Thus while it will be appreciated from the foregoing that a shiploading system has been developed, it will also become apparent that a method for loading fungible material from an approach conveying means on to a ship has also been discovered. The method producing new and useful results in the loading of the ship's cargo bins as well as in average loading rates and efficiency in the use of shiploading components. Thus the method improves the efficiency of a system that uses an approach conveying means having a discharge point to deliver the materials through a shiploader to a longitudinal transport device being positioned at a predetermined longitudinal orientation.

The method includes providing at least one bridge conveying means and a slewing means for conveying material from the bridge conveying means on to the slewing means. Thus the process includes delivering material from the approach conveyor means on to the bridge conveying means, and then delivering the material from the bridge on to the slewing means. The process is then followed by the step of distributing the material over a ship's cargo bin by means of the slewing means.

It should be understood that the slewing means disclosed herein may also have the capability of luffing. Furthermore, it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A method for producing a loaded shipment of material within a cargo bin of a ship, the ship being moored at a predetermined position, the method comprising the steps of:

providing a flow of material from an approach conveying means;

transferring the flow of material from the approach conveying means to a bridge conveying means having a first end and a second end, the first end of the bridge conveying means being pivotally supported for pivotal motion about a point near the approach conveying means and the second end of the bridge conveying means being moveably supported on a runway, the runway having a first end, a second end and a mid portion between the first end and the second end, the runway terminating at the first end of the runway, the first end of the runway being closer to the longitudinal transport device in the predetermined position than the mid portion of the runway, the flow of material being transferred from the approach conveying means to the first end of the bridge conveying means;

providing at least one slewing conveying means having a first end and a second end, the first end of the siewing conveying means being connected to and in fluid communication with the second end of the bridge conveying means, the first end of the slewing conveying means pivoting and accepting the flow of material at the first end of the slewing conveying means and conveying the flow of material to the second end of the slewing conveying means, the second end of the slewing conveying means being capable of discharging the flow of material in to the cargo bin of the ship through a discharge point, the slewing conveying means capable of movement from at least the runway's first end to the runway's second end;

delivering the flow of material from the second end of the bridge conveyor means on to the first end of the slewing conveying means, and delivering the flow of material from the second end of the slewing conveying means into the cargo bin, so that the flow of material being delivered into the cargo bin may be continuously adjusted by simultaneously adjusting the position of the bridge conveyor means and the discharge point of the slewing conveyor means relative to the bridge conveyor means and the cargo bin.

2. A system for transporting material from an approach conveying means on to an elongate transport device, the elongate transport device being positioned at a predetermined orientation relative to the approach conveying means, the system comprising:

at least one slewing conveying means having a first end and a second end, the slewing conveying means pivoting and accepting material at the first end and conveying the material to the second end, the second end of the slewing conveying means being capable of discharging the material on to the elongate transport device; and a bridge conveying means having a first end and a second end, the first end of the bridge conveying means being pivotally supported for pivotal motion of the first end about a point near the approach conveying means and the second end of the bridge conveying means being moveably supported near the first end of said slewing conveying means, the first end of said slewing conveying means is moveably mounted on a runway, the runway having a first end, a second end and a mid portion between the first end and the second end the slewing conveying means movable from at least the runway's first end to the runway's second end, the runway terminating at the first end of the runway, the first end of the runway being closer to the longitudinal transport device in the predetermined position than the mid portion of the runway, so that the second end of the bridge conveying means may move together with the first end of the slewing conveying means, so that material from the approach conveying means delivered to the first end of the bridge conveying means may be delivered by the bridge conveying means to the second end of the slewing conveying means, so that the slewing conveying means may deliver the material to the longitudinal transport device.

3. A system according to claim 2 wherein said runway is arched.

4. A system according to claim 3 wherein said first end of the slewing means is mounted on carriage means for moving the slewing means over the runway.

5. A system according to claim 4 wherein said runway is mounted at a distance from and independent of the approach conveying means.

6. A ship loading system for delivering material from an approach conveying means on to a vessel at a predetermined position relative to the approach conveying means, the approach conveying means having a discharge point, the ship loading system comprising:

at least one bridge conveyor means having a first end and a second end, the first end of the bridge conveyor means being pivotally positioned proximate to the discharge point on the approach conveying means, the second end of the bridge conveyor means being moveably supported over a runway, the runway having a first end, a mid portion and a second end, the runway terminating at the first end of the runway, the first end of the runway being positioned closer to the predetermined position of the vessel than the mid portion of the runway; and a slewing conveying means having a first end and a second end, the slewing conveying means pivoting and accepting material at the first end of the slewing conveying means and conveying the material to the second end of the slewing conveying means, the second end of the slewing conveying means being capable of discharging the material into the vessel, so that material from the approach conveying means may be delivered from the approach conveying means on to the first end of the bridge conveyor and then delivered by the bridge conveyor to the slewing conveying means, so that the material may then be delivered by the slewing conveying means onto the vessel and adjustments of the position of the second end of the slewing conveying means may be made by moving the first end of the slewing conveying means over the runway from at least the runway's first end to the runway's second end.

7. A ship loading system according to claim 6 wherein said bridge conveyor means comprises a pair of bridge conveyors.

8. A ship loading system according to claim 7 wherein the runway is arched.

9. A system according to claim 8 wherein said first end of the slewing means is mounted on carriage means for moving the slewing means over the runway.

10. A system according to claim 9 wherein the runway is mounted at a distance from and independent of the approach conveying means.

* * * * *